US012106230B2

(12) United States Patent
Mihindukulasooriya et al.

(10) Patent No.: US 12,106,230 B2
(45) Date of Patent: Oct. 1, 2024

(54) IMPLEMENTING RELATION LINKING FOR KNOWLEDGE BASES

(71) Applicant: International Business Machines Corporation, Armonk, NY (US)

(72) Inventors: Nandana Mihindukulasooriya, Cambridge, MA (US); Gaetano Rossiello, Brooklyn, NY (US); Alfio Massimiliano Gliozzo, Brooklyn, NY (US); Pavan Kapanipathi Bangalore, Westchester, NY (US); Salim Roukos, Redondo Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 17/079,202

(22) Filed: Oct. 23, 2020

(65) Prior Publication Data

US 2022/0129770 A1 Apr. 28, 2022

(51) Int. Cl.
*G06N 5/04* (2023.01)
*G06F 16/33* (2019.01)
*G06N 20/00* (2019.01)

(52) U.S. Cl.
CPC ............ *G06N 5/04* (2013.01); *G06F 16/334* (2019.01); *G06N 20/00* (2019.01)

(58) Field of Classification Search
CPC ...... G06N 3/092; G06N 3/044; G06N 3/0455; G06N 3/08; G06N 3/088; G06N 5/04; G06N 20/00; G06F 16/3329; G06F 16/3346; G06F 16/3347; G06F 16/9024; G06F 16/90335; G06F 16/90332; G06F 16/243; G06F 40/40; G06F 40/205; G06F 16/248; G06F 16/24578; G06F 16/334; G10L 15/22; G10L 13/00; G10L 15/16; G10L 2015/223; G10L 15/26; Y02D 10/00
See application file for complete search history.

(56) References Cited

U.S. PATENT DOCUMENTS

| 7,899,666 | B2 | 3/2011 | Varone |
| 8,775,341 | B1 | 7/2014 | Commons |
| 9,378,273 | B2 | 6/2016 | Chu-Carroll et al. |
| 10,210,161 | B2 | 2/2019 | Yin |

(Continued)

FOREIGN PATENT DOCUMENTS

| CA | 2990060 C | * | 11/2021 | ........... G06Q 10/025 |
| CA | 3166481 A1 | * | 3/2022 | ........... G06F 16/337 |

(Continued)

OTHER PUBLICATIONS

Yu et al., "Improved Neural Relation Detection for Knowledge Base Question Answering," arXiv, 2017, 12 pages, retrieved from https://arxiv.org/abs/1704.06194.

(Continued)

*Primary Examiner* — Steven P Sax
(74) *Attorney, Agent, or Firm* — Zilka-Kotab, P.C.

(57) ABSTRACT

A computer-implemented method according to one embodiment includes identifying a natural language query; translating the natural language query into an intermediate representation; converting the intermediate representation into one or more query triples; and performing relation linking between each of the one or more query triples and a plurality of knowledge base triples.

16 Claims, 7 Drawing Sheets

(56) References Cited

U.S. PATENT DOCUMENTS

| | | | |
|---|---|---|---|
| 10,296,524 | B1 | 5/2019 | Tung et al. |
| 10,410,139 | B2 | 9/2019 | Kanani et al. |
| 10,585,924 | B2 | 3/2020 | Nguyen |
| 11,055,355 | B1* | 7/2021 | Monti ............... G06F 16/90332 |
| 11,580,145 | B1* | 2/2023 | Kumar .................. G06N 3/092 |
| 2013/0262361 | A1* | 10/2013 | Arroyo ............... G06F 16/3344 706/46 |
| 2015/0339577 | A1* | 11/2015 | Waltinger ............... G06F 16/00 706/50 |
| 2017/0228372 | A1* | 8/2017 | Moreno ............ G06F 16/24522 |
| 2017/0337268 | A1* | 11/2017 | Ait-Mokhtar ....... G06F 16/3344 |
| 2019/0220471 | A1* | 7/2019 | Mota Toledo ........ G06F 16/906 |
| 2020/0057946 | A1* | 2/2020 | Singaraju ............... G06N 5/022 |
| 2020/0110784 | A1* | 4/2020 | Sharma .............. G06Q 30/0633 |
| 2020/0302122 | A1* | 9/2020 | Lai .......................... G06F 16/28 |
| 2022/0059238 | A1* | 2/2022 | Häme .................... G16H 40/67 |

FOREIGN PATENT DOCUMENTS

| | | | | |
|---|---|---|---|---|
| CN | 100380373 | C | * 4/2008 | ............. G06F 16/30 |
| CN | 109408821 | A | 3/2019 | |
| CN | 110674317 | A | 1/2020 | |
| CN | 110990638 | A | * 4/2020 | ......... G06F 16/9024 |
| EP | 3514706 | A1 | * 7/2019 | ........... G06F 16/243 |
| EP | 3674921 | A1 | * 7/2020 | |
| KR | 20080084803 | A | * 9/2008 | |
| KR | 20170101609 | A | * 9/2017 | |
| WO | WO-2006042028 | A2 | * 4/2006 | ......... G06F 17/2785 |
| WO | 2020005601 | A1 | 1/2020 | |
| WO | WO-2020242086 | A1 | * 12/2020 | ........... G06F 16/243 |
| WO | WO-2021001047 | A1 | * 1/2021 | ......... G06F 16/3335 |

OTHER PUBLICATIONS

Dubey et al., "EARL: Joint Entity and Relation Linking for Question Answering over Knowledge Graphs," International Semantic Web Conference, 2018, 16 pages, retrieved from https://arxiv.org/abs/1801.03825.

Xu et al., "Hybrid Question Answering over Knowledge Base and Free Text," Proceedings of COLING 2016, the 26th International Conference on Computational Linguistics: Technical Papers, Dec. 2016, pp. 2397-2407.

Pan et al., "Unsupervised Entity Linking with Abstract Meaning Representation," Human Language Technologies: The 2015 Annual Conference of the North American Chapter of the ACL, 2015, pp. 1130-1139.

Dash et al., U.S. Appl. No. 16/713,776, filed Dec. 13, 2019.

Anonymous, "Finding fine-grained detector from trained deep learning models," IP.com Prior Art Database, Technical Disclosure No. IPCOM000242472D, Jul. 17, 2015, pp. 1-3.

Anonymous, "Cascade deep learning model training for visual analytics," IP.com Prior Art Database, Technical Disclosure No. IPCOM000245969D, dated Apr. 21, 2016, pp. 1-3.

Dubey et al., "Pairwise Confusion for Fine-Grained Visual Classification," European Conference on Computer Vision, 2018, pp. 1-17.

Abhishek et al., "Fine-Grained Entity Type Classification by Jointly Learning Representations and Label Embeddings," Proceedings of the 15th Conference of the European Chapter of the Association for Computational Linguistics, vol. 1, Long Papers, Apr. 3-7, 2017, pp. 797-807.

Madabushi et al., "Integrating Question Classification and Deep Learning for improved Answer Selection," Proceedings of the 27th International Conference on Computational Linguistics, Aug. 20-26, 2018, pp. 3283-3294.

Khoury, R., "Question Type Classification Using a Part-of-Speech Hierarchy," Conference on Autonomous and Intelligent Systems, 2011, pp. 212-221.

Lopez et al., "PowerAqua: supporting users in querying and exploring the Semantic Web," Semantic Word Journal, 2011, vol. 3, No. 3, 18 pages.

Zhou et al., "A C-LSTM Neural Network for Text Classification," arXiv, Nov. 30, 2015, 10 pages, retrieved from https://arxiv.org/abs/1511.08630.

Wang et al., "A Joint Model for Questioning Answering and Question Generation," arXiv, Jun. 5, 2017, 7 pages, retrieved from https://arxiv.org/abs/1706.01450.

Choi et al., "Ultra-Fine Entity Typing," arXiv, Jul. 13, 2018, 10 pages, retrieved from https://arxiv.org/abs/1807.04905.

Li et al., "Learning Question Classifiers," The 19th International Conference on Computational Linguistics, 2002, 7 pages, retrieved from https://www.aclweb.org/anthology/C02-1150/.

SQuAD, "SQuAD 2.0: The Stanford Question Answering Dataset," GitHub, Accessed on Dec. 10, 2019, 21 pages, retrieved from https://rajpurkar.github.io/SQuAD-explorer/.

Grace Period Disclosure, "Leveraging Semantic Parsing for Relation Linking Over Knowledge Bases," Nandana Mihindukulasooriya, Gaetano Rossiello, Pavan Kapanipathi, Ibrahim Abdelaziz, Srinivas Ravishankar, Mo Yu, Alfio Gliozzo, Salim Roukos, Alexander Gray, Sep. 16, 2020, 12 pages.

Sakor et al., "Old is Gold: Linguistic Driven Approach for Entity and Relation Linking of Short Text," Proceedings of NAACL-HLT, Jun. 2019, pp. 2336-2346.

Hakimov et al., "Applying Semantic Parsing to Question Answering over Linked Data: Addressing the Lexical Gap," NLDB 2015: Natural Language Processing and Information Systems, 2015, 7 pages, retrieved from https://www.semanticscholar.org/paper/Applying-Semantic-Parsing-to-Question-Answering-the-Hakimov-Unger/126ee532d48302b31f899ab392c51ad982ee5cad.

Diefenbach et al., "Towards a Question Answering System over the Semantic Web," Semantic Web, 2018, 15 pages, retrieved from https://arxiv.org/pdf/1803.00832.pdf.

Auer et al., "DBpedia: A Nucleus for a Web of Open Data," ISWC/ASWC, 2007, pp. 722-735.

Chakraborty et al., "Introduction to Neural Network based Approaches for Question Answering over Knowledge Graphs," arXiv, 2019, pp. 1-34, retrieved from https://arxiv.org/abs/1907.09361.

Devlin et al., "BERT: Pre-training of Deep Bidirectional Transformers for Language Understanding," Proceedings of NAACL-HLT, 2019, pp. 4171-4186.

Hoffner et al., "Survey on Challenges of Question Answering in the Semantic Web," Semantic Web, 2016, pp. 1-25, retrieved from http://www.semantic-web-journal.net/content/survey-challenges-question-answering-semantic-web.

Hu et al., "Answering Natural Language Questions by Subgraph Matching over Knowledge Graphs," IEEE Transactions on Knowledge and Data Engineering, Oct. 2017, 15 pages.

Kingsbury et al., "Propbank: The Next Level of Treebank," Proceedings of Workshop Treebanks and Lexical Theories, 2003, 12 pages, retrieved from http://citeseerx.ist.psu.edu/viewdoc/summary?doi=10.1.1.332.2882.

Wu et al., "Zero-shot Entity Linking with Dense Entity Retrieval," arXiv, 2019, 6 pages, retrieved from https://arxiv.org/pdf/1911.03814v1.pdf.

Lehmann et al., "DBpedia—A Large-scale, Multilingual Knowledge Base Extracted from Wikipedia," Semantic Web, 2012, pp. 1-29, retrieved from https://www.semanticscholar.org/paper/DBpedia-A-large-scale%2C-multilingual-knowledge-base-Lehmann-Isele/d2946a868682e4141beabc288d79253ae254c6e1.

Lukovnikov et al., "Pretrained Transformers for Simple Question Answering over Knowledge Graphs," ISWC, 2019, 16 pages, retrieved from http://jens-lehmann.org/files/2019/iswc_bert_simple_questions.pdf.

Mintz et al., "Distant supervision for relation extraction without labeled data," Proceedings of the 47th Annual Meeting of the ACL and the 4th IJCNLP of the AFNLP, Aug. 2009, pp. 1003-1011.

Mulang et al., "Matching Natural Language Relations to Knowledge Graph Properties for Question Answering," Semantics, 2017, 9 pages.

Naseem et al., "Rewarding Smatch: Transition-Based AMR Parsing with Reinforcement Learning," arXiv, 2019, 7 pages, retrieved from https://arxiv.org/pdf/1905.13370.pdf.

(56) References Cited

OTHER PUBLICATIONS

Pan et al., Entity Enabled Relation Linking, ISWC, 2019, 16 pages, retrieved from https://www.cs.vu.nl/~frankh/postscript/ISWC2019-RelationLinker.pdf.

Rossiello et al., "Learning Relational Representations by Analogy using Hierarchical Siamese Networks," Proceedings of NAACL-HLT, Jun. 2019, pp. 3235-3245.

Singh et al., "Frankenstein: A Platform Enabling Reuse of Question Answering Components," ESWC, 2018, pp. 624-638.

Singh et al., "Capturing Knowledge in Semantically-typed Relational Patterns to Enhance Relation Linking," K-CAP, Dec. 2017, pp. 1-8.

Soares et al., "Matching the Blanks: Distributional Similarity for Relation Learning," Proceedings of the 57th Annual Meeting of the Association for Computational Linguistics, Aug. 2019, pp. 2895-2905.

Usbeck et al., "9th Challenge on Question Answering over Linked Data (QALD-9)," Semdeep/NLIWoD@ISWC, CEUR Workshop Proceedings, vol. 2241, 2018, 7 pages, retrieved from https://www.semanticscholar.org/paper/9th-Challenge-on-Question-Answering-over-Linked-Usbeck-Gusmita/4f83e1b64f57ae0d546076279426e85c0e60298b.

Trivedi et al., "LC-QuAD: A Corpus for Complex Question Answering over Knowledge Graphs," ISWC, 2017, 8 pages, retrieved from http://jens-lehmann.org/files/2017/iswc_lcquad.pdf.

Usbeck et al., "7th Open Challenge on Question Answering over Linked Data (QALD-7)," ESWC, 2017, 11 pages, retrieved from https://svn.aksw.org/papers/2017/ESWC_2017_QALD/public.pdf.

Vaswani et al., "Attention Is All You Need," 31st Conference on Neural Information Processing Systems, 2017, pp. 1-11.

Yin et al., "Simple Question Answering by Attentive Convolutional Neural Network," Proceedings of COLING 2016, the 26th International Conference on Computational Linguistics: Technical Papers, Dec. 2016, pp. 1746-1756.

Mohammed et al., "Strong Baselines for Simple Question Answering over Knowledge Graphs with and without Neural Networks," Proceedings of NAACL-HLT 2018, Jun. 2018, pp. 291-296.

\* cited by examiner

IMPLEMENTING RELATION LINKING FOR KNOWLEDGE BASES

STATEMENT REGARDING PRIOR DISCLOSURES BY THE INVENTOR OR A JOINT INVENTOR

The following disclosure is submitted under 35 U.S.C. § 102(b)(1)(A). DISCLOSURE: "Leveraging Semantic Parsing for Relation Linking over Knowledge Bases" (Mihindukulasooriya et al.), which was made publicly available on Sep. 16, 2020.

BACKGROUND

The present invention relates to knowledge bases, and more specifically, this invention relates to responding to natural language queries to knowledge bases.

Knowledge bases (KBs) play an important role in modern enterprises. Knowledge bases include public encyclopedic knowledge bases as well as private knowledge bases that are built from private company knowledge. In many practical use cases, users submit queries to these knowledge bases using a natural language format. However, responding to such natural language queries using current techniques often results in poor performance and results with poor relevance.

SUMMARY

A computer-implemented method according to one embodiment includes identifying a natural language query; translating the natural language query into an intermediate representation; converting the intermediate representation into one or more query triples; and performing relation linking between each of the one or more query triples and a plurality of knowledge base triples.

According to another embodiment, a computer program product for implementing relation linking for knowledge bases includes a computer readable storage medium having program instructions embodied therewith, where the computer readable storage medium is not a transitory signal per se, and where the program instructions are executable by a processor to cause the processor to perform a method including identifying, by the processor, a natural language query; translating, by the processor, the natural language query into an intermediate representation; converting, by the processor, the intermediate representation into one or more query triples; and performing, by the processor, relation linking between each of the one or more query triples and a plurality of knowledge base triples.

According to another embodiment, a system includes a processor; and logic integrated with the processor, executable by the processor, or integrated with and executable by the processor, where the logic is configured to identify a natural language query; translate the natural language query into an intermediate representation; convert the intermediate representation into one or more query triples; and perform relation linking between each of the one or more query triples and a plurality of knowledge base triples.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing relation linking for knowledge bases.

In one general embodiment, a computer-implemented method includes identifying a natural language query; translating the natural language query into an intermediate representation; converting the intermediate representation into one or more query triples; and performing relation linking between each of the one or more query triples and a plurality of knowledge base triples.

In another general embodiment, a computer program product for implementing relation linking for knowledge bases includes a computer readable storage medium having program instructions embodied therewith, where the computer readable storage medium is not a transitory signal per se, and where the program instructions are executable by a processor to cause the processor to perform a method including identifying, by the processor, a natural language query; translating, by the processor, the natural language query into an intermediate representation; converting, by the processor, the intermediate representation into one or more query triples; and performing, by the processor, relation linking between each of the one or more query triples and a plurality of knowledge base triples.

In another general embodiment, a system includes a processor; and logic integrated with the processor, executable by the processor, or integrated with and executable by the processor, where the logic is configured to identify a natural language query; translate the natural language query into an intermediate representation; convert the intermediate representation into one or more query triples; and perform relation linking between each of the one or more query triples and a plurality of knowledge base triples.

Figure 1:
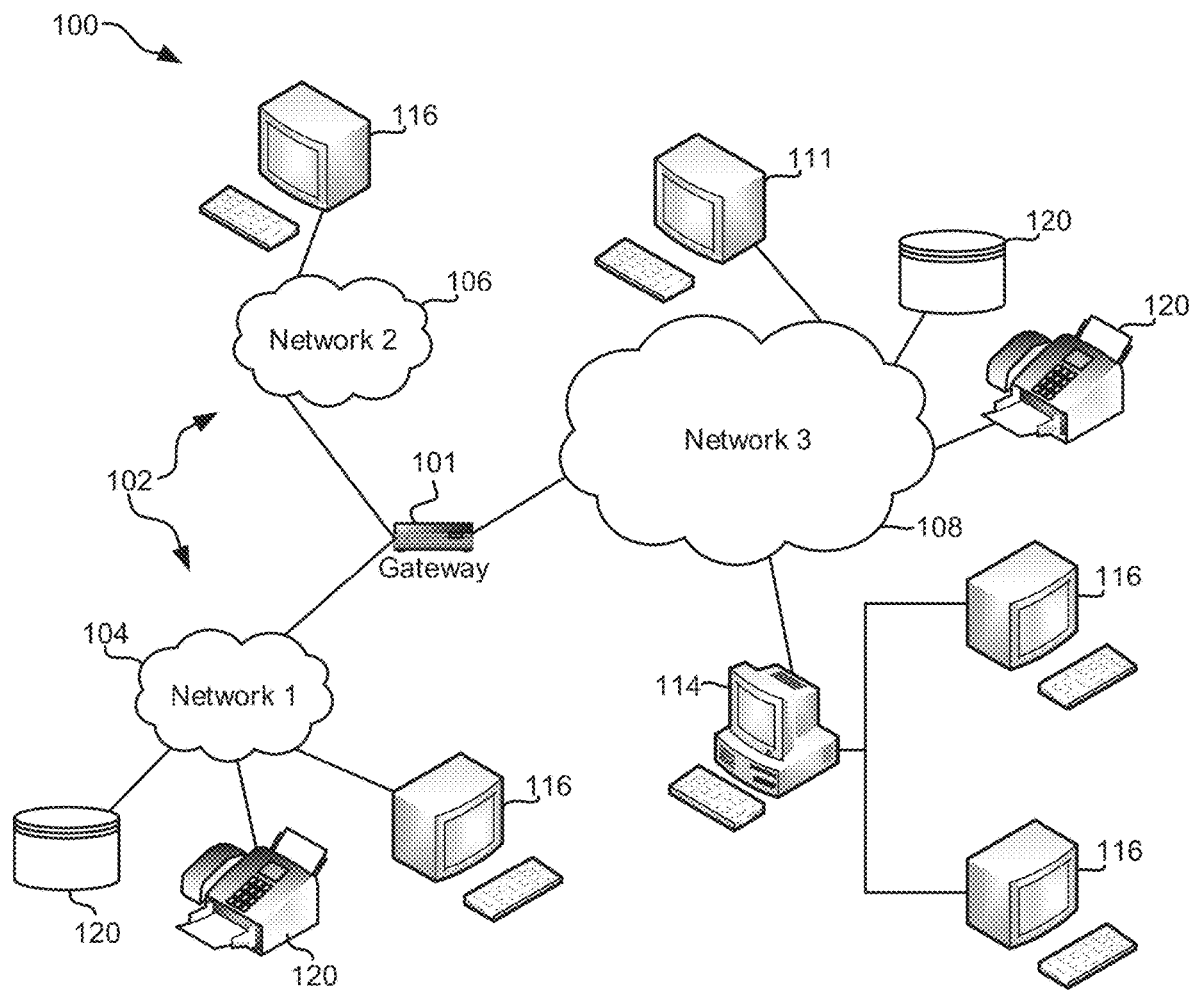
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
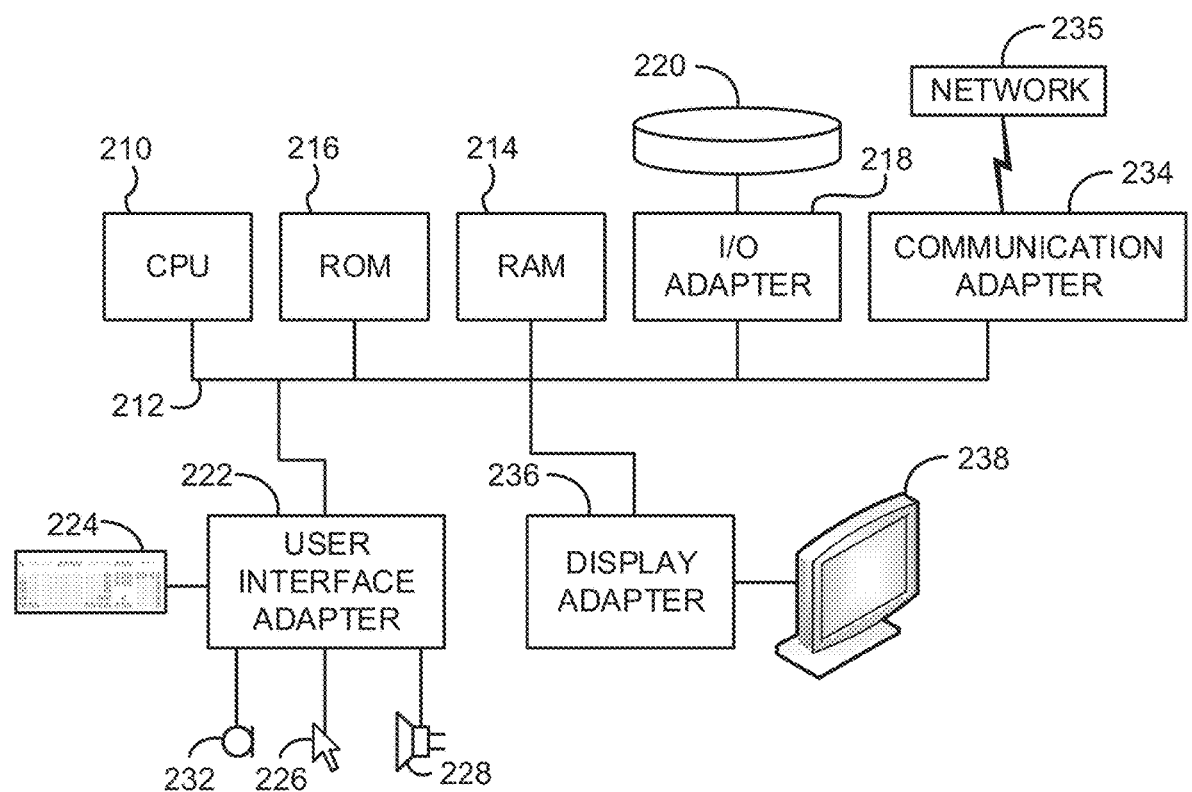
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
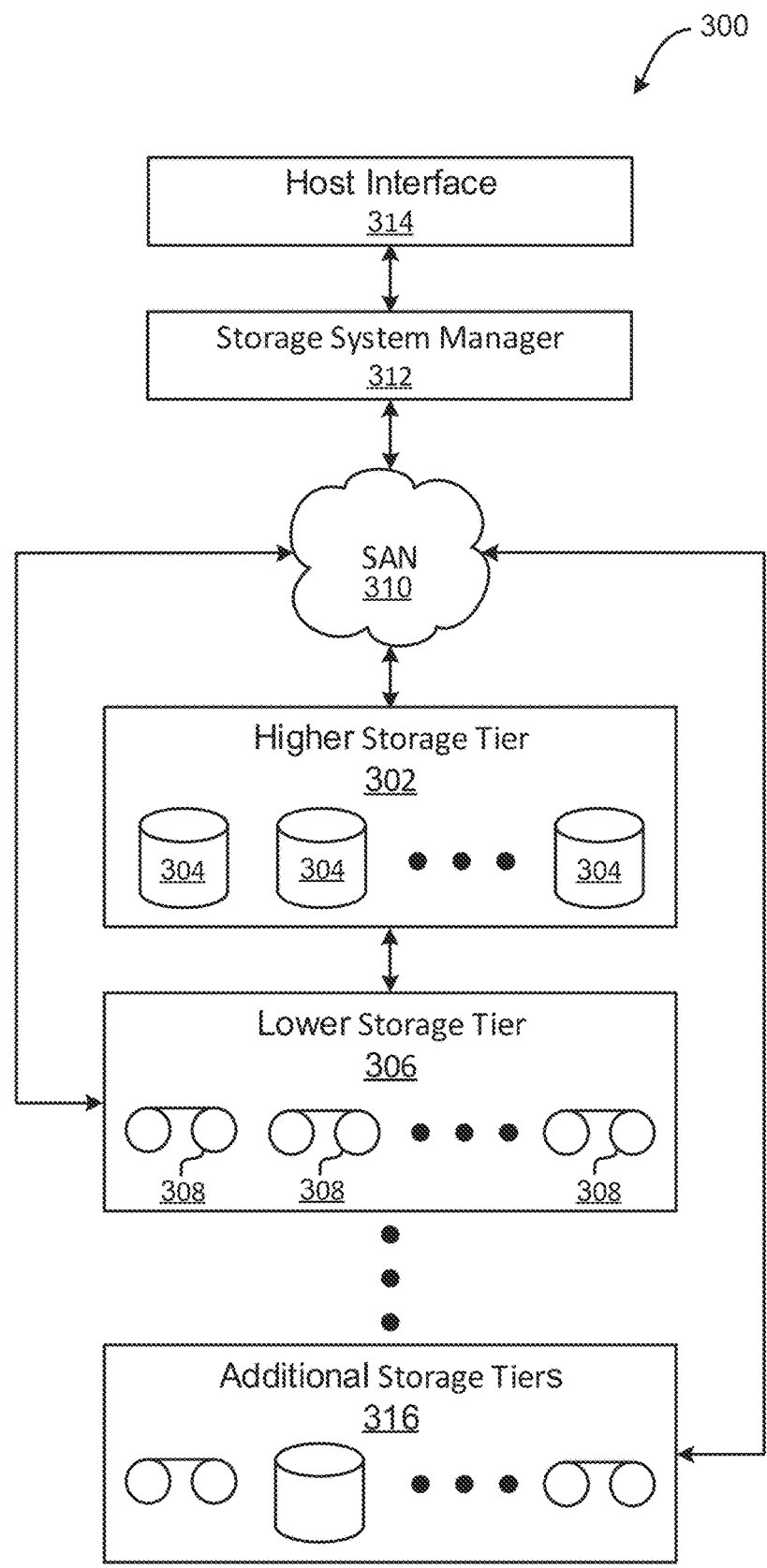
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
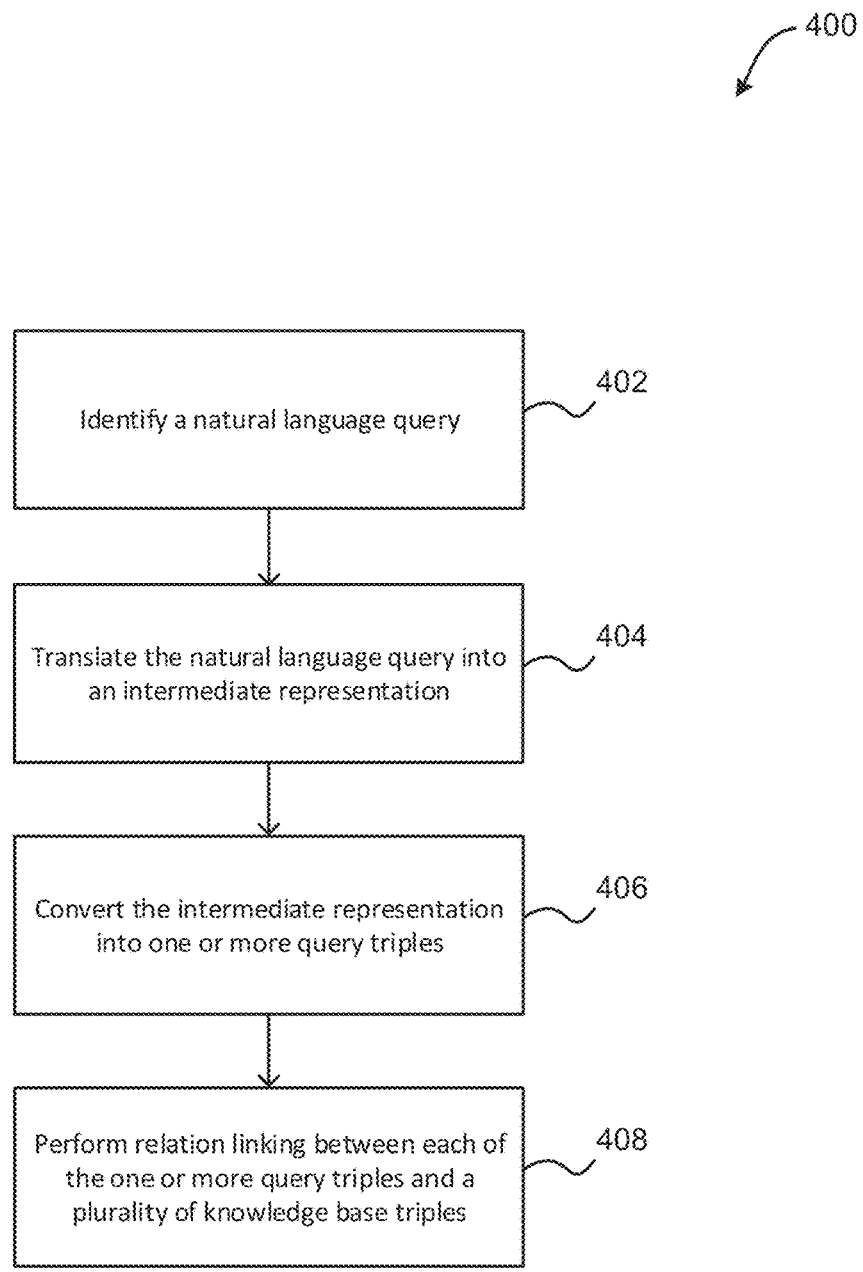
FIG. 4 illustrates a method for implementing relation linking for knowledge bases, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 6-7, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a natural language query is identified. In one embodiment, the natural language query may include a query received in a natural language format. In another embodiment, the natural language query may be received as input via a tangible computing device from one or more applications, one or more users, etc.

Additionally, in one embodiment, the natural language query may include a query to be run against a knowledge base. For example, the knowledge base may include a corpus of structured and/or unstructured information compiled from one or more sources. In another example, the knowledge base may be public (e.g., available to the public), private (e.g., available to a preapproved subset of users, etc.).

Further, in one embodiment, the natural language query may include a question to be answered using the knowledge base.

Further still, method 400 may proceed with operation 404, where the natural language query is translated into an intermediate representation. In one embodiment, the intermediate representation may include a graph/tree (e.g., an abstract meaning representation (AMR) graph, etc.). In another embodiment, the natural language query may be parsed to identify components of the natural language query.

Also, in one embodiment, the identified components may be used to create the graph. In another embodiment, the graph may include a rooted, directed, acyclic graph. In yet another embodiment, each node in the graph may represent a concept, and edges within the graph may represent relationships between the concept nodes. In still another embodiment, a root node of the graph may represent a predetermined focus of the natural language query.

In addition, method 400 may proceed with operation 406, where the intermediate representation is converted into one or more query triples. In one embodiment, the query triples may include AMR triples. For example, the AMR graph may be converted into AMR triples. In another embodiment, each of the AMR triples may be in the form of a subject-predicate-object expression.

Furthermore, in one embodiment, the AMR triples may have the same subject-predicate-object structure as knowledge base triples stored in a knowledge base. In another embodiment, the AMR triples may be created by performing a combinatorial expansion of all arguments within the AMR graph to create binary relations, and pruning combinations having a probability below a predetermined threshold.

Further still, method 400 may proceed with operation 408, where relation linking is performed between each of the one or more query triples and a plurality of knowledge base triples. In one embodiment, performing the relation linking may include linking the subject and object portions of the one or more query triples to the knowledge base. For example, the subject and object portions of the one or more query triples may be compared against the subject and object portions of the knowledge base triples stored in the knowledge base to determine matching knowledge base triples for the one or more query triples.

Also, in one embodiment, performing the relation linking may include inputting the one or more query triples into a trained machine learning environment. For example, the trained machine learning environment may take the one or more query triples as input. In another embodiment, the trained machine learning environment may output for each of the query triples a plurality of relationships with knowledge base triples, as well as a score indicative of a strength of a similarity for each relationship.

For example, a first score for a first relationship that is higher than a second score for a second relationship may indicate that the first relationship is stronger than the second relationship. In another example, a stronger relationship may indicate that the triples in the relationship are more relevant to each other when compared to triples in a weaker relationship.

Additionally, in one embodiment, the scores may be used to determine an answer to the natural language query. For example, a knowledge base triple having the highest score may be used to create a response to the natural language query. In another example, the machine learning environment may be trained using a distant supervision dataset created automatically using natural language sentences and the knowledge base triples within the knowledge base.

In this way, relation linking may be used to provide a response to a natural language query of a knowledge base. This may improve a relevance of query results, and may eliminate a need to reformulate a natural language query to obtain improved results, which may in turn reduce an amount of network traffic and improve a performance of a computing system responding to the queries.

Figure 5:
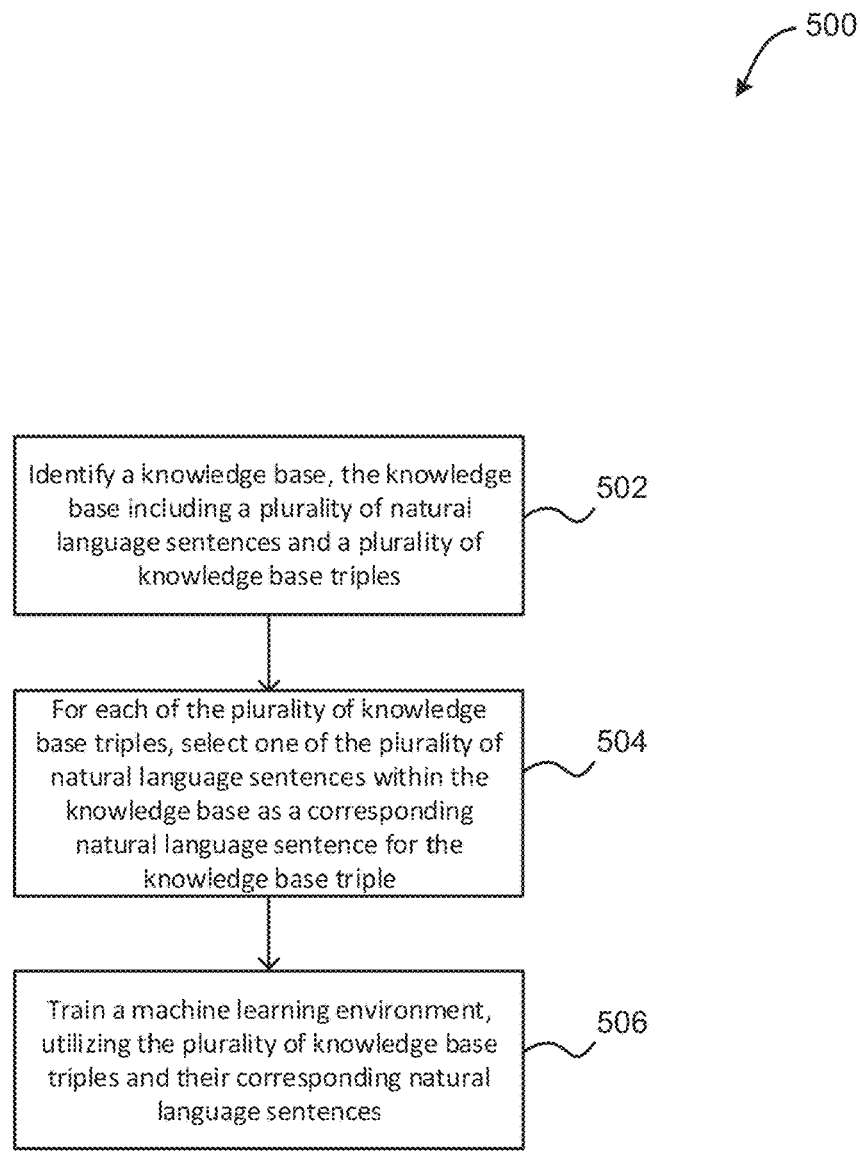
FIG. 5 illustrates a method for training a machine learning environment using distant supervision, in accordance with one embodiment of the present invention.

Now referring to FIG. 5, a flowchart of a method 500 for training a machine learning environment using distant supervision is shown according to one embodiment. The method 500 may be performed in accordance with the present invention in any of the environments depicted in FIGS. 1-3 and 6-7, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a knowledge base is identified, where the knowledge base includes a plurality of natural language sentences and a plurality of knowledge base triples. In one embodiment, the knowledge base may include a corpus of structured and/or unstructured information compiled from one or more sources. In another embodiment, the knowledge base may be public (e.g., available to the public), private (e.g., available to a preapproved subset of users, etc.).

Additionally, in one embodiment, the natural language sentences may include sentences constructed using words in a natural language format (e.g., as opposed to a constructed or formal language, etc.). In another embodiment, the plurality of knowledge base triples may each include a semantic triple (e.g., a resource description framework (RDF) triple, etc.). In yet another embodiment, each of the plurality of knowledge base triples may include a statement about a portion of data (e.g., the natural language sentences) within the knowledge base.

Further, in one embodiment, each of the plurality of knowledge base triples may be in the form of a subject-predicate-object expression. For example, a subject-predicate-object expression may identify a subject, and object, and a relation between the two (e.g., the predicate).

Further still, in one embodiment, the knowledge base may be stored within one or more data stores (e.g., databases, etc.). In another embodiment, the knowledge base may be available online or may be available only offline. In yet another embodiment, the knowledge base may be received as input from one or more applications, one or more users, etc.

Also, method 500 may proceed with operation 504, where for each of the plurality of knowledge base triples, one of the plurality of natural language sentences within the knowledge base is selected as a corresponding natural language sentence for the knowledge base triple. In one embodiment, for each knowledge base triple, the corresponding natural language sentence that is selected may best represent the knowledge base triple within the knowledge base.

In addition, in one embodiment, selecting the corresponding natural language sentence for a knowledge base triple may include parsing and analyzing each (or a predetermined subset) of the natural language sentences within the knowledge base. In another embodiment, within the knowledge base, a natural language sentence that meets preapproved criteria with respect to the knowledge base triple may be selected as the corresponding natural language sentence for that triple.

For example, for a given knowledge base triple, a natural language sentence may be selected where the subject and object of the knowledge base triple co-occur within the natural language sentence (and do not overlap as a single word), and the natural language sentence includes at least a predetermined number of terms (e.g., tokens, etc.) and at least one verb.

Furthermore, method 500 may proceed with operation 506, where a machine learning environment is trained utilizing the plurality of knowledge base triples and their corresponding natural language sentences. In one embodiment, each of the corresponding natural language sentences may be translated into a triple (e.g., a semantic triple in the form of a subject-predicate-object expression).

Further still, in one embodiment, each of the corresponding natural language sentences may be parsed to identify the subject, predicate, and object within the corresponding natural language sentence. For example, these elements may be extracted and inserted into a triple for the corresponding natural language sentence.

Also, in one embodiment, each knowledge base triple may be linked to the triple translated from the corresponding natural language sentence (e.g. utilizing metadata, etc.). In another embodiment, the linked triples may constitute a distant supervision dataset.

Additionally, in one embodiment, the linked triples may be input into a machine learning environment as training data. For example, the machine learning environment may be trained to assign a high similarity score to a relationship between each of the linked triples. This may improve an accuracy of the machine learning environment. In another embodiment, the machine learning environment may include one or more deep learning implementations, one or more neural networks, etc.

In this way, training data may be automatically created for a knowledge base (e.g. utilizing a hardware processor, etc.). This training data may improve an accuracy of a machine learning environment that determines similarity scores between an input natural language query (converted into a triple) and existing knowledge base triples. The manual creation of training data may also be avoided.

Leveraging Semantic Parsing for Relation Linking Over Knowledge Bases

Knowledge base question answering systems are heavily dependent on relation extraction and linking modules. However, the task of extracting and linking relations from text to knowledge bases faces two primary challenges: the ambiguity of natural language and lack of training data. To overcome these challenges, SLING is provided, which includes a relation linking framework which leverages semantic parsing using Abstract Meaning Representation (AMR) and distant supervision. SLING integrates multiple approaches that capture complementary signals such as linguistic cues, rich semantic representation, and information from the knowledge base. This approach achieves optimal performance on all benchmarks.

Relationship Extraction and Linking (REL) is a necessary task for Knowledge Base Question Answering (KBQA). One goal of REL in KBQA is to identify the relations in input natural language questions and link them to their equivalent relations in a knowledge base, which are then used to construct a corresponding query to retrieve answers. For example, shown below is a query for the question "Who is starring in movies produced by Director A?":

```
SELECT DISTINCT ?result WHERE {
?film dbo:starring ?result .
?film dbo:producer dbr:Director A .
}
```

Identifying the relevant relations in the question and linking them to their equivalent Dataset relationships dbo:starring, dbo:country, and dbo:producer is the primary goal of REL in the context of KBQA. REL for KBQA faces the following challenges:

(1) Knowledge bases have a large number of relationships which makes it challenging to acquire training data to build data-intensive deep learning models. For instance, a dataset may have thousands of relationships (some of which are generated automatically from infobox keys).

(2) There is an extensive lexical gap between the surface form of relations in text and how they are represented in the KB, which makes the linking between them challenging. For example, the question above does not explicitly mention any reference to the relationship dbo:country which is a required relation to form the SPARQL query that can retrieve the answer.

(3) Determining multiple relationships and their source and target concepts in a sentence. The example question above re-quires three relationships to be linked with their corresponding source and target entities/unbound variables.

In order to address the aforementioned challenges, in this work, a Semantic LINkinG system SLING is provided. SLING allows for a distant supervision based approach that leverages semantic parsing such as Abstract Meaning Representation (AMR) for relation extraction and linking. Distant supervision techniques address the challenge of lack of training data, particularly for thousands of relations in KBs. Transforming the text to a semantic parse such as AMR provides advantages that include:

(1) normalizing relations to a set of standard predicates,
(2) identification of named entities, and
(3) entity typing with a pre-defined type system.

These characteristics of AMR help to alleviate the lexical gap by reducing different phrasings of relations to its predicate set. Furthermore, they also help to automatically determine the relationship structure of an input question and extract all relationships useful for forming a SPARQL query, hence addressing the challenge of extracting multiple relationships from questions text.

In summary, a generic framework is provided that integrates different approaches for REL based on statistical predicate alignment, word embedding and neural networks. Furthermore, the framework is modular to allow for integrating more techniques to the pipeline.

Also, AMR semantic parses of texts are harnessed for REL in KBQA. This usage of AMR successfully addresses the lexical gap and multiple relationship problems in REL and achieves optimal performance.

Figure 6:
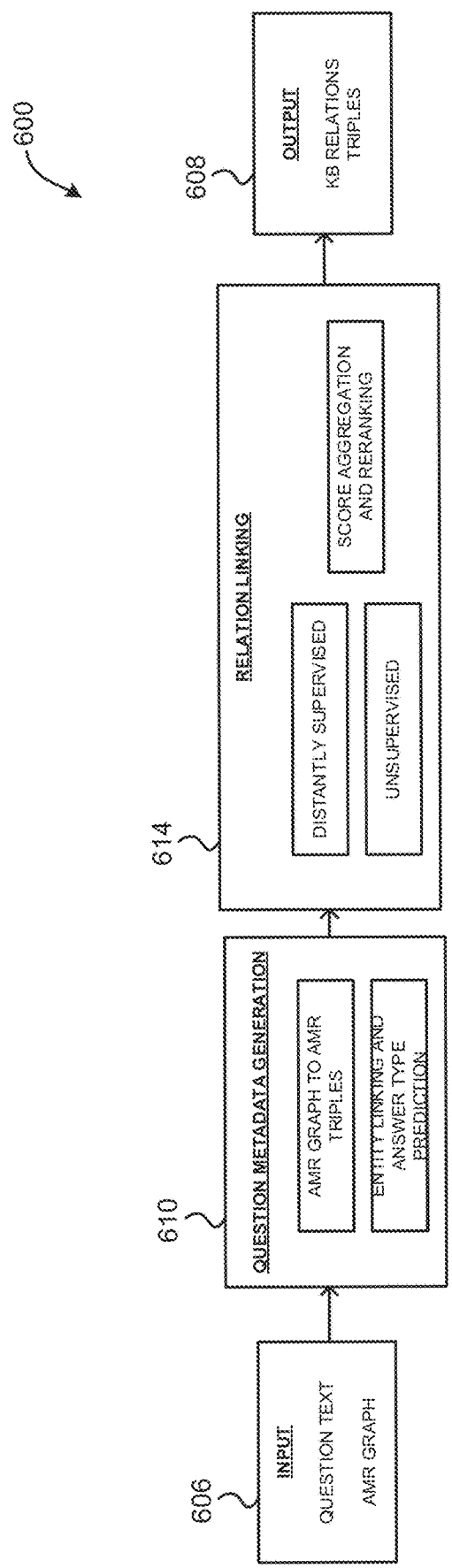
FIG. 6 illustrates an overview of a semantic linking system (SLING) with a process-oriented view and a specific example, in accordance with one embodiment of the present invention.

FIG. 6 illustrates an overview 600 of a semantic linking system (SLING) with a process-oriented view 602 and a specific example 604. The input 606 to SLING is a question in natural language along with its corresponding AMR representation. The required output 608 is a ranked list of relations corresponding to every subject-object pair in the sentence. The input 606 is processed by the components in Question Metadata Generation 610 to extract AMR triples (subject-object pair and their AMR predicate) and generate metadata corresponding to each of them. Each module in Relation Linking 614 produces a ranked list of KB relations with scores for a metadata-enriched AMR triple. These are aggregated to produce the required output 608.

SLING's design is modular to allow different relation linking modules to be plugged in and used as needed. The motivation for using multiple modules is to capture different signals such as linguistic cues from the question, richer semantic information from the AMR predicates and roles, semantic similarities of terms, and heuristics from the KB itself.

Four different relation linking modules may be implemented. The first two are relation linking approaches; both rely on distantly supervised data which is created automatically using knowledge base documents. The other two relation linking modules are unsupervised. Each of the four modules provides relations with corresponding scores. These scores are aggregated to output a final ranked list of relations.

An example of the metadata and the output 608 is shown in FIG. 6. The input data 606 includes the question text and its AMR graph. The modules in Question Metadata Generation 610 convert the AMR graph into a set of intermediate AMR triples. Subjects and objects can be either named entities such as "Director A" or nominal entities such as "movie" (referring a set of unknown movies). Named entities are linked to KB entities and nominal entities to KB classes. This information is passed to individual relation linking modules 614. Finally, the system generates a set of output triples 608 with a scored ranked list of KB relations.

Question Metadata Generation

The components in Question Metadata Generation, process the question text and its AMR to produce the necessary metadata for relation linking components. The metadata include: (a) AMR triples, (b) KB entities and their types, and (c) answer type prediction.

AMR Graphs

As an input, SLING expects a richer semantic representation of the question generated by an AMR parser. An AMR parse is a rooted, directed, acyclic graph expressing "who is doing what to whom" in a sentence or a question. For example, an AMR graph may be created for the question "Who is starring in movies produced by Director A?". Each node in the graph represents a concept, whereas edges represent relations between concepts that include datasetframes, nominal entities (types) and named entities. AMR graphs have several desirable properties: (1) AMR detects named entities and maps them to predefined entity types (normalized) which forms the arguments of relations that have to be mapped to a KB, (2) AMR not only identifies relations in text but also normalizes them using datasetframes; (3) AMR reduces the ambiguity of natural language by converting relation phrases to their corresponding sense and (4) for questions, a special node, amr-unknown, is used to represent a placeholder for the answer to the question. Furthermore, the root node of the AMR graph (e.g., the focus node) identifies the main focus of the question. Therefore, by using semantic parsing, syntactic variations are abstracted out in order to capture the meaning of the question in a more normalized manner.

AMR Graph to AMR Triples

A dataset may have only binary relations (two arguments). However, frames in AMR can have more than two arguments. For example, the produce-012 frame can have four core roles; creator (arg0), creation (arg1), created from (arg2), and benefactive (arg3) and other non-core roles such as time or location whereas on a dataset there are only binary relations such as dbo:producer, dbp:productionDate, dbo:basedOn, or dbo:location. Despite the richer representation, this inherent mismatch between n-ary arguments of frames and binary predicates in the KB poses a challenge.

Therefore, AMR triples may be generated with a similar structure to KB triples (subject, predicate, and object) to facilitate their alignment. To resolve this issue, an approach is used that performs combinatorial expansion of all arguments of a frame to create binary relations and then prunes less probable combinations.

Entity/Type Linking and Answer Type Prediction.

Once the AMR triples are derived, the next step is to link its subject and object to the KB. Subjects and objects from AMR can either be entities (e.g., Director A→dbr:Director A) or classes (movie→dbo:Film) in the KB. Entities are first linked to the KB using a regular entity linking tool that is based on a dataset Lookup.

For classes, the mapping between AMR type system and a dataset system are generated semi-automatically. First, for each of 126 types from an AMR type system, their instances are collected from first type graphs and linked to KB entities. Then KB entity types are collected and they are ranked by frequency. Top 5 types are checked manually to map a KB type to each dataset type. This is a one-time process. This mapping can be performed against any type system given a tool for entity linking is available. The special node, amr-unknown, is mapped to a KB-type by using an LSTM-based answer type prediction model. For instance, given a question such as "Who is starring in movies produced by Director A?", it predicts dbo:Actor as the answer type.

Distantly Supervised Relation Linking

For question metadata such as AMR parse, AMR triples with entity and type information are used as input to the four REL modules. Distantly supervised data is generally used in tasks where there is a lack of training data. The lack of training data is also a significant challenge for REL tasks on KBQA datasets. Particularly, if REL is desired to be performed, training data for thousands of relations is needed. On the other hand, the KBQA datasets have 408 and 5000 questions covering a small subset of datasetrelations. In order to address this issue, training data is collected using distant supervision, which eliminates the need for task-specific supervision for relation linking.

Distant Supervision Dataset

Figure 7:
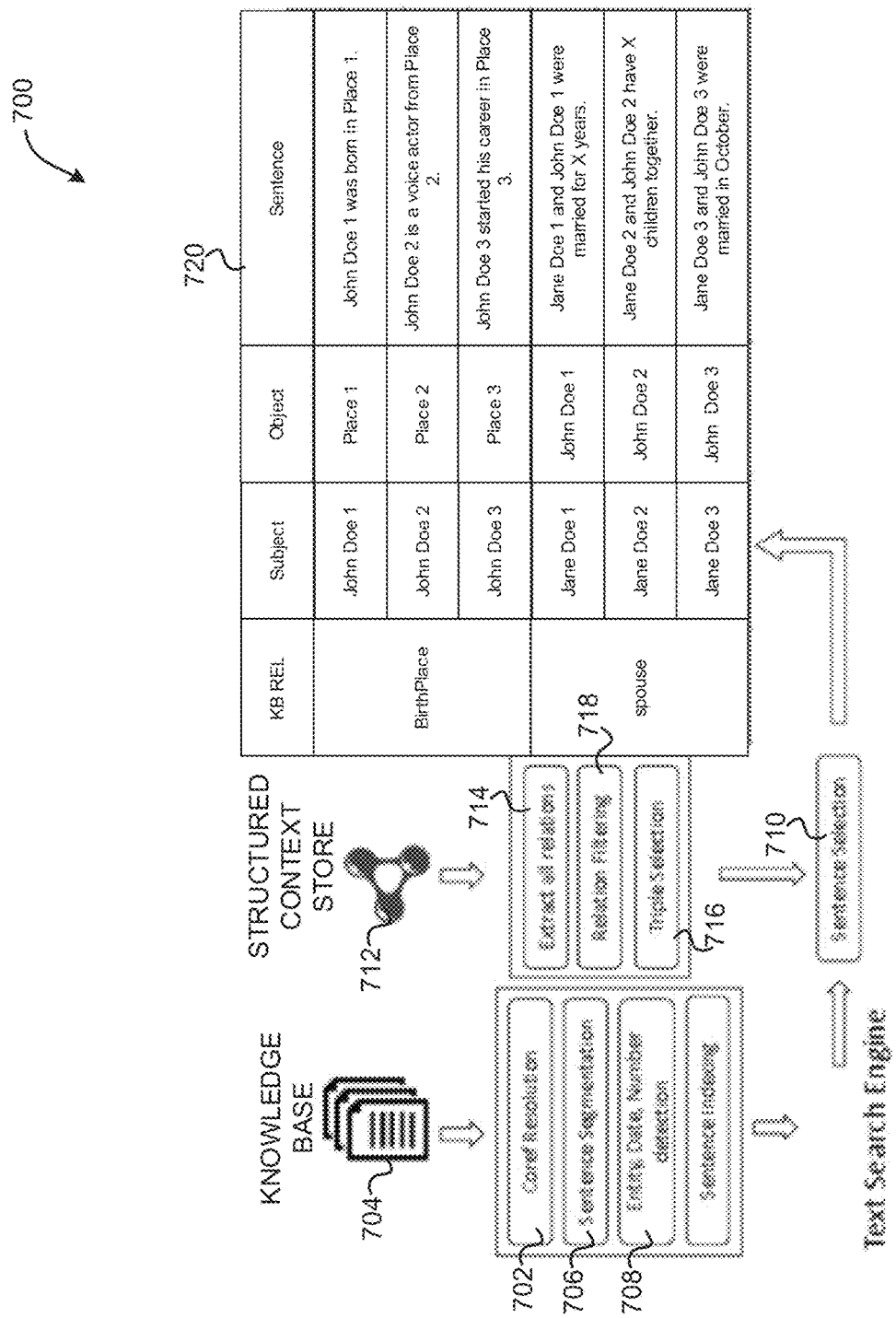
FIG. 7 illustrates an exemplary distant supervision data generation pipeline, in accordance with one embodiment of the present invention.

To train REL models, for each relation, training examples (sentence, subject, object) mapped to their corresponding KB relation are required. FIG. 7 shows an exemplary distant supervision data generation pipeline 700, according to one exemplary embodiment. The pipeline 700 includes exemplary mappings 720 (e.g., Sentence: John Doe was born in Honolulu, Hawaii, subject: John Doe, object: Honolulu, Hawaii is mapped to (KB relation: dbo:birthPlace)).

Corpus Pre-Processing and Indexing

As shown in FIG. 7, co-reference resolution 702 is performed on each document within a knowledge base (KB) corpus 704. The corpus is then tokenized into sentences via sentence segmentation 706, and named entities are identified 708 in each sentence to serve as text search indices. Metadata such as the document the sentence was extracted from and its position in the document are also stored. This metadata is later used for selecting sentences 710.

Relation Selection

To address the issue of the large number of relations in KB, a manageable subset is selected. A structured content store 712 extracts structured content from the KB 704 and has a long tail of relations mainly due to uncommon infobox keys from the KB 704 that are not widely used in queries. The number of examples that are generated by the distant supervision process depends on the number of triples containing the relation in the KB 704.

While unsupervised modules use all relations in the structured content store 712, distantly supervised modules require some amount of examples to train the modules; thus the number of relations used by them depends of their frequency of occurrence.

Selection of Examples

For each extracted relation 714, a predetermined amount (e.g., up to 1000 KB) of triples are selected 716 by ordering them by the sum of subject and object in-degrees. One assumption may include that these entities are central and generally their corresponding KB articles contain more information. Then for each KB triple, a single example sentence is selected, which is the first cooccurrence in entity's KB 704 article. Sentences are chosen that satisfy the following: 1) subject and object co-occur, 2) have at least 4 tokens, 3) have at least 1 verb and 4) the entity surface forms do not overlap in the text (when one is a multi-word containing other). These basic heuristics increase the probability that the sentence contains a relation and also filter out accidental co-occurrences in titles, lists, etc.

Statistical AMR Predicate Alignment

In one embodiment, a relation linking module leverages the information present in the AMR semantic parses to generate alignments between predicates in AMR graphs and KB ontology relations.

Building PropBank Alignments

One challenge for creating these alignments is the inherent mismatch between frame-based representation and triple-based representation. In AMR graphs, a single frame captures a rich set of information using n-ary relations (e.g., who is doing what to whom, when, etc.) while triples in KBs capture simpler atomic facts using binary relations. For example, the frame bear-02, which is used to capture the event of giving birth to a child, has two core roles: arg0 (mother), arg1 (child) and several non-core roles including location (place of birth), time (time of birth) as shown below.

To address this mismatch in the number of arguments, the AMR graph is first decomposed into a set of AMR triples. This is performed by creating binary relations between all entities participating in different roles of the frame using combinatorial expansion, as shown below. The generated binary relations are paths between the two nodes in the graph and follow the structure, <dataset-frame>.<subject-role>.<object-role>.

Given a combination of two entities, for example, John Doe (with the arg0 role) and Jane Doe (with the arg1 role), two AMR triples are generated, one with John Doe as subject and Jane Doe as object and the other vice-versa as shown below:

John Doe bear02.arg0.arg1 Jane Doe
Jane Doe bear02.arg1.arg0 John Doe

Nevertheless, this process generates a large number of AMR triples that will not necessarily have their mapping relation in the KB. For example, in a dataaset, the place or the date that a mother gave a birth to a child (bear02.arg0.location/time) is not represented as an attribute of the mother but only as attributes of the child and consequently there is no equivalent relation for those in the KB. This can be addressed by analyzing how often a given AMR triple can be aligned to a KB triple.

Because KBs are generally multi-graphs there are cases where two entities are connected with multiple relations in the KB. For example, if it is assumed that John Doe was born and died in the same place, two entities will be related both by birthPlace and deathPlace relations. In such cases with multiple candidates, lexical similarity may be used between frame definition/aliases and relation labels to disambiguate and select the most similar one.

Finally, to accommodate error propagation from both distant supervision dataset and AMR parsing, which could lead to noise in the alignments, type constraints are also used to further refine the alignments. The goal of this step is to induce type constraints for each role in a given frame. This is performed by collecting all entities participating in a given role in a frame (e.g., bear-02.ARGO) and analyzing their types (including data types such as numerics and dates).

Using this information, proxy domain and range constraints for AMR binary relations can be generated. These constraints are used to filter out any aligned relation that does not match with the type constraints.

To summarize, for generating these alignments efficiently, the distant supervision dataset, defined as $D=\{(s_i, r_i, o_i, t_i), \ldots\}$, is used, where $\{s_i, r_i, o_i\}$ identifies the subject, relation, and object of the KB triple and $t_i$ is the corresponding sentence. Each $t_i$ is parsed to generate an AMR graph $a_i$. Each $a_i$ is then converted into a set of AMR triples $x_j=\{\hat{s}_j, p_j, \hat{o}_j\}$ where $x_i \in a_i$ and $p_j$ is the AMR binary predicate, and $\hat{s}_j$ and $\hat{o}_j$ are the subject and object from the AMR graph. Finally, an AMR triple $x_j$ is checked for, where $\hat{s}_j=s_i$ and $\hat{o}_j=o_i$ and if found, one alignment between $r_i$ and $p_j$ is created.

Finding Relation Candidates

Once the complete dataset is processed and alignments are filtered using type constraints, for each AMR binary predicate $p_j$ a set of cumulative alignments $A(p_j)=\{(r_0, c_0), \ldots, (r_n, c_n)\}$ is obtained where each r is a KB relation and c is an alignment count. Using that, for each AMR binary predicate $p_j$, relation candidate scores are calculated using:

$$\text{relation\_score}(p_j, r_n) = [c_n/\max(c)]*[1/1+\log(\text{inv\_pred\_count}(r_n)]$$

where max(c) is highest count in $A(p_j)$ and inv_pred_count $(r_n)$ is the inverse predicate count, i.e., number of distinct AMR predicates which $r_n$ is aligned at least once.

Neural Model for Relation Linking

Statistical AMR mapping has the following characteristics that can be addressed using a neural approach:

(1) mapping generic frames such as have-01 can be ambiguous. For example for: "Did John Doe have children?" has the frame have that needs to be mapped to dbo:child.

(2) lexical gap where the same relation type can be expressed as different linguistic patterns.

Therefore, a neural model is trained for relation linking by exploiting the distant supervision dataset. The neural model produces dense embedding vectors for input questions, which can learn to project the same relation type's different surface forms close in the latent space.

Training Phase

Leveraging the distant supervision dataset, training data is defined as $D=\{(x_0, r_0), \ldots, (x_N, r_N)\}$. Here $r_i \in R$ are the relation types, and $x_i=(t_i, s_i, o_i)$ are the relation instances consisting of a textual sentence $t_i$ and the spans of the subject $s_i$ and the object $o_i$. The set R represents the vocabulary of $K=|R|$ distinct relation types. A neural network M is trained on D with the purpose to predict the correct relation type $r_k$ given the instance $x_k$ by minimizing the cross-entropy loss regarding the conditional probability $p_M(\cdot|x_k)$ modeled by M, with respect to the true relation $t_k$.

In order to generate a vector representation of the relation instance x, a relation encoder is used. This encoder is an adaptation of a Transformer architecture that encodes a given sentence while being aware of the subject and object. To achieve this entity-aware encoding, four special tokens are used to mark the start and end positions of both entities in the sentence, [SUBJ], [\SUBJ], [OBJ] and [\OBJ] respectively. For instance, the second relation instance of birthPlace in FIG. 7 is represented as "[SUBJ] John Doe [\SUBJ] is a voice actor from [OBJ] Tokyo [\OBJ]". These new special tokens are randomly initialized and fine-tuned during training, whereas all the other tokens are initialized using the pre-trained BERT-base embeddings. The vectors of the final-layer hidden states of the start entity markers of subject and object entities are concatenated and fed into a fully connected layer to get the final embedding vector for the relation instance x.

Finally, to estimate $p_M(r_k|x_k)$, a further classification layer is added with the output size K followed by a softmax function.

Inference Phase

There are several aspects to address when applying the trained neural relation linking model M to deal with question relationship linking. In particular, how to mark the missing entities from the question, which consists of two cases:

(1) the missing entity is the answer;
(2) the missing entity is an intermediate entity when the question requires multiple hops to reach the answer. The AMR graph to AMR triples feature is used to handle these challenges.

Intermediate Entities

Consider an exemplary question and its generated metadata. The question requires to first find some movie entities having the dbo:producer relation with Director A, e.g., Movie 1, then identifies another relation dbo:star from the movie entity. Since the movie name is missing in the question text, when predicting its relationship to Director A, the surface form of arg2 is taken for star-01.arg2.arg1, i.e., the word \movies" as the object. In this way, the following input relation instance may be generated to the neural model M:

Who is starring in [OBJ] movies [nOBJ] produced by [SUBJ] Director A [nSUBJ]?.

Unknown (Answer) Entities

Consider the same question as above. The predicate star-01.arg2.arg1 has no explicit text for the arg1 since the amr-type is unknown, which refers to the answer. In this case, the question word is marked "Who" is for the arg2. Therefore the following format for the relation instance is generated for our neural model:

"[OBJ] Who [\OBJ] is starring in [SUBJ] movies [\SUBJ] produced by Director A?".

Finally, with the aforementioned treatments, for each relation instance a ranked list of relation types is generated and sorted by their probability scores produced by the neural model.

Unsupervised Relation Linking and Score Aggregation

Lexical Similarity

To derive the score of a relation with respect to an AMR triple, its lexical similarity to the question text and AMR predicate is computed. For each relation candidate, like dbo:deathPlace, its label is considered as a word sequence death place. Each question is concatenated, e.g., Who was married to Person A, with the AMR predicate of the triple (e.g., marry from marry-01) to get the other word sequence. The lexical similarity between the two word sequences is computed by first calculating a word-by-word cosine similarity based on embeddings. If there are m words in one word sequence, and n words in the other, this produces m×n similarity scores. This is max-pooled to produce a single score as output.

Knowledge Base Connections

In KBQA, the entities from the questions are identified and linked to a KB first. Therefore, the task of relation linking also assumes the existence of such linked KB entities and entity types as described in the Question Metadata Generation step. Hence, candidate relations that also connect these detected entities can be scored higher. For example, given the question "Who created Show A?", to predict the relation in this question, all relations connected to the KB entity (dbr:Show A) as the object and a subject of KB type dbo:Person or any subclass of it are scored (which is predicted by answer type prediction). A soft constraint is then applied to focus more on the relations that are within this set.

Score Aggregation

The scores from each module are normalized using min-max normalization. The final score of a relation is the arithmetic sum of its normalized score from each module, and a ranked list of relations is obtained for the AMR triple. This process is repeated for every AMR triple extracted from the question.

In one embodiment, a method is provided for relation linking between a knowledge base (KB) and a semantic parse (e.g., one or more abstract meaning representation (AMR) graphs created using semantic role labeling (SRL)) using a parallel corpus with distant supervision. Additionally, a method is provided for performing statistical AMR predicate—KB relation alignments (which automatically induce a set of KB relations for each AMR predicate using mapping frequencies and ontology constraints). Further, a method is provided for training a neural reinforcement learning (RL) network for performing knowledge base question and answer (KBQA) using distant supervision.

Additionally, in one embodiment, a method for relation linking leveraging AMR graphs takes a KB and a text corpus with overlapping information as offline input, and question text as an online input, and outputs KB relations for text (in a context of a triple with subject, subject_type, object, object_type). For example, a distant supervision parallel corpus is prepared offline for performing relation linking. This may provide improvements in both triple selection, sentence selection, and relation selection.

Further, in one embodiment, the question text is parsed online using an AMR parse to obtain an AMR representation (e.g., graph) of the question text. The AMR graph is then converted into triples with two levels of information, and the subject, subject_type, object, and object_type are linked to a KB. In another embodiment, this information includes ABox information and TBox information.

Further still, in one embodiment, triple information is provided to different relation linkers to get relation candidates with scores. The results from multiple relation linkers are aggregated, and the predicted relations are re-ranked at two levels: at the triple level and at KB relations within the triple.

In one embodiment, a method is provided for performing statistical AMR predicate—KB relation alignments. The method takes a distantly supervised parallel corpus and a knowledge graph (KG) (e.g., both ABox and TBox, etc.) as input, and provides a ranked list of KB relations for each AMR predicate as output.

For example, the distantly supervised dataset is parsed using an AMR parser. Additionally, all AMR graphs are converted into triples. Further, for each of the AMR predicates, a ranked list of aligned relations is calculated based on the normalized frequency, as well as a score based on how common a given predicate is in the KB.

Additionally, value constraints are induced for each role in a datasetframe. Further, domain/range constraints are extracted for KB relations (e.g., using explicit definitions in the ontology and/or implicit definitions from data profiling). Further still, alignments that are inconsistent with the ontology constraints are filtered out.

In another embodiment, a method is provided for training a neural reinforcement learning (RL) network for knowledge base question and answer (KBQA) using distant supervision. The method takes as inputs a knowledge base (KB), a document collection (DC), a question in a natural language, a placeholder for the subject, and a placeholder for the object. The method provides as output a list of relation types sorted by probability scores.

For example, to perform training, for each instance of each relation type in KB, a sentence is identified in the DC where both the subject and object co-occur. The relation type is then assigned to each matched sentence as a label class. The neural model is then trained using the generated dataset.

Additionally, to perform prediction, given a new question Q, a sequence of tokens representing two arguments E1 and E2 are identified. (Q, E1, E2) are fed into the model as input. The model then produces the list of relation types along with the probability scores.

In one embodiment, a method of utilizing a computing device to respond to a natural language query includes accessing by the computing device a knowledge base for formulating a response to the natural language query; generating by the computing device a parallel corpus parallel to the knowledge base, the parallel corpus linking entities of the knowledge base with values related to the entities; receiving by the computing device a natural language query from a user; parsing one or more entities from the natural language query; associating the one or more parsed entities from the natural language query with entities from the parallel corpus; and utilizing by the computing device values from the parallel corpus to generate a response to the natural language query.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a natural language query;
translating the natural language query into an intermediate representation;
converting the intermediate representation into one or more query triples having two levels of information; and
performing, for each of the one or more query triples, relation linking between the respective query triple and a plurality of knowledge base triples;
wherein the intermediate representation includes a graph, where: nodes in the graphs represents concepts, and edges within the graph represent relationships between concept nodes;
wherein performing the relation linking includes inputting the one or more query triples into a machine learning environment;
wherein the machine learning environment outputs, for the one or more query triples, a plurality of relationships of the respective query triple with knowledge base triples, as well as scores indicative of a strength of similarity for the respective relationship;
training the machine learning environment using a distant supervision dataset, including:
identifying a knowledge base, the knowledge base including a plurality of natural language sentences and a plurality of knowledge base triples,
for individual ones of the plurality of knowledge base triples, selecting one of the plurality of natural language sentences within the knowledge base as a corresponding natural language sentence for the knowledge base triple, and
training the machine learning environment, utilizing the plurality of knowledge base triples and their corresponding natural language sentences;
determining an answer to the natural language query using the scores and the trained machine learning environment; and
outputting the answer for displaying on a display.

2. The computer-implemented method of claim 1, comprising providing query triple information to different relation linkers for obtaining relation candidate knowledge base triples with the scores indicative of a strength of a similarity for each of the corresponding relationships, wherein results from the relation linkers are aggregated, and comprising ranking predicted relations at the following levels: at a triple level and at a knowledge base relation level within the triple.

3. The computer-implemented method of claim 1, comprising linking a subject, subject_type, object, and object_type of the query triples to the knowledge base triples.

4. The computer-implemented method of claim 1, wherein the intermediate representation includes an abstract meaning representation (AMR) graph.

5. The computer-implemented method of claim 1, wherein translating the natural language query into the intermediate representation includes:
parsing the natural language query to identify components of the natural language query; and
creating the graph, utilizing the identified components, where the graph is a rooted, directed, acyclic graph.

6. The computer-implemented method of claim 1, wherein
a root node of the graph represents a main focus of the natural language query.

7. The computer-implemented method of claim 1, wherein the query triples include abstract meaning representation (AMR) triples in the form of a subject-predicate-object expression, where the AMR triples have the same structure as the knowledge base triples.

8. The computer-implemented method of claim 1, wherein performing the relation linking includes linking subject and object portions of the one or more query triples to the knowledge base.

9. A computer program product for implementing relation linking for knowledge bases, the computer program product comprising a non-transitory computer readable storage medium having program instructions embodied therewith, the program instructions executable by a processor to cause the processor to perform a method comprising:
identifying, by the processor, a natural language query;
translating, by the processor, the natural language query into an intermediate representation;
converting, by the processor, the intermediate representation into one or more query triples having two levels of information for each subject and each object in the respective query triple; and
performing, by the processor, for each of the one or more query triples, relation linking between the respective query triple and a plurality of knowledge base triples,
wherein the intermediate representation includes a graph, where: nodes in the graph represent concepts, and edges within the graph represent relationships between concept nodes;

wherein performing the relation linking includes inputting the one or more query triples into a machine learning environment;

wherein the machine learning environment outputs for the one or more query triples a plurality of relationships of the respective query triple with knowledge base triples, as well as a score indicative of a strength of similarity for the respective relationship; and comprising training the machine learning environment using a distant supervision dataset, including:

identifying a knowledge base, the knowledge base including a plurality of natural language sentences and a plurality of knowledge base triples, for individual ones of the plurality of knowledge base triples, selecting one of the plurality of natural language sentences within the knowledge base as a corresponding natural language sentence for the knowledge base triple, and training the machine learning environment, utilizing the plurality of knowledge base triples and their corresponding natural language sentences;

determining an answer to the natural language query using the scores and the trained machine learning environment; and outputting the answer for displaying on a display.

10. The computer program product of claim 9, wherein the information at one of the levels of each of the query triples is given to one type of relation linker and the information at the other of the levels is given to a different type of relation linker for obtaining, from the relation linkers, relation candidate knowledge base triples with scores indicative of a strength of a similarity for each of the corresponding relationships.

11. The computer program product of claim 9, wherein the intermediate representation includes an abstract meaning representation (AMR) graph.

12. The computer program product of claim 9, wherein translating the natural language query into the intermediate representation includes:

parsing the natural language query to identify components of the natural language query; and creating the graph utilizing the identified components, where the graph is a rooted, directed, acyclic graph.

13. The computer program product of claim 9, wherein a root node of the graph represents a predetermined focus of the natural language query.

14. The computer program product of claim 9, wherein the query triples include abstract meaning representation (AMR) triples in the form of a subject-predicate-object expression, where the AMR triples have the same structure as knowledge base triples stored in a knowledge base.

15. The computer program product of claim 9, wherein performing the relation linking includes linking subject and object portions of the one or more query triples to the knowledge base.

16. A system, comprising:

a processor; and logic integrated with the processor, executable by the processor, or integrated with and executable by the processor, the logic being configured to:

identify a natural language query;

translate the natural language query into an intermediate representation;

convert the intermediate representation into one or more query triples having two levels of information;

perform, for each of the one or more query triples, relation linking between the respective query triple and a plurality of knowledge base triples, wherein the intermediate representation includes a graph, where: nodes in the graphs represents concepts, and edges within the graph represent relationships between concept nodes;

wherein performing the relation linking includes inputting the one or more query triples into a machine learning environment;

wherein the machine learning environment outputs, for the one or more query triples, a plurality of relationships of the respective query triple with knowledge base triples, as well as scores indicative of a strength of similarity for the respective relationship;

train the machine learning environment using a distant supervision dataset, including:

identifying a knowledge base, the knowledge base including a plurality of natural language sentences and a plurality of knowledge base triples, for individual ones of the plurality of knowledge base triples, selecting one of the plurality of natural language sentences within the knowledge base as a corresponding natural language sentence for the knowledge base triple, and training the machine learning environment, utilizing the plurality of knowledge base triples and their corresponding natural language sentences;

determine an answer to the natural language query using the scores and the trained machine learning environment; and output the answer for displaying on a display.

* * * * *